L. MILLER.
PIPE COUPLING.
APPLICATION FILED MAR. 28, 1910.
960,667.
Patented June 7, 1910.
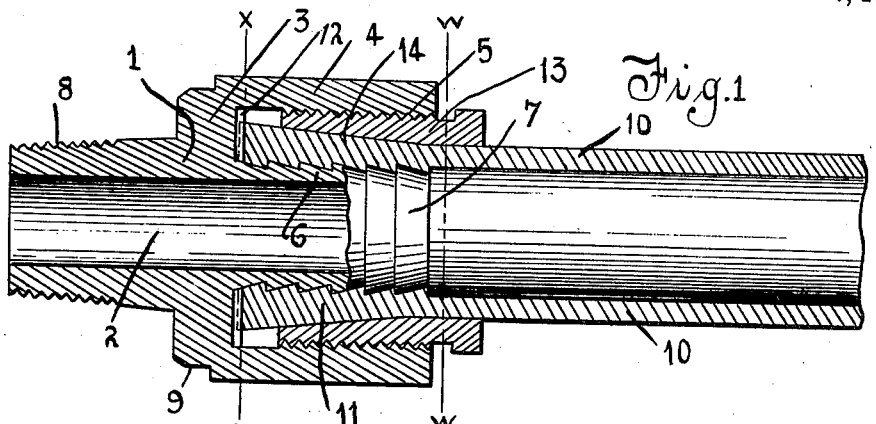
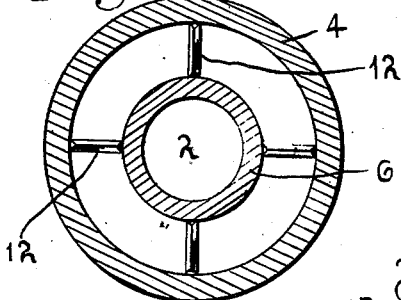
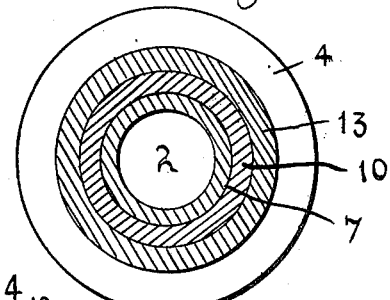
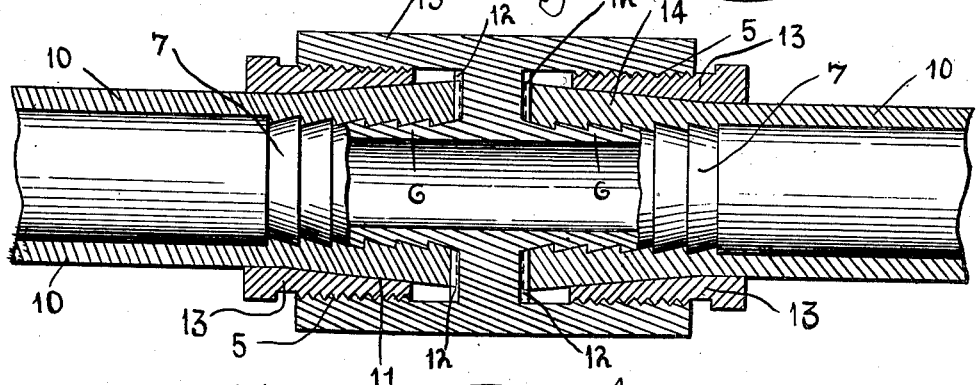
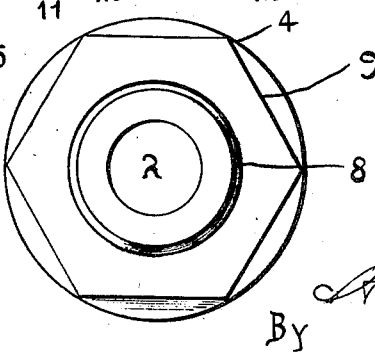
WITNESSES
Edwin Frey
K. H. Butler
INVENTOR
L. MILLER
By H. C. Everts
Attorneys

UNITED STATES PATENT OFFICE.

LAWRENCE MILLER, OF PITTSBURG, PENNSYLVANIA.

PIPE-COUPLING.

960,667.  Specification of Letters Patent. Patented June 7, 1910.

Application filed March 28, 1910. Serial No. 551,937

*To all whom it may concern:*

Be it known that I, LAWRENCE MILLER, a citizen of the United States of America, residing at North Side Pittsburg, in the county of Allegheny and State of Pennsylvania, have invented certain new and useful Improvements in Pipe-Couplings, of which the following is a specification, reference being had therein to the accompanying drawing.

This invention relates to pipe couplings, and the objects of my invention are, first, to provide positive and reliable means for connecting a lead pipe to a wrought iron pipe; second, to obviate the necessity of using wiped joints in establishing various fittings; third, to obviate the necessity of using solder or other material for obtaining a water-tight connection; fourth, to provide a coupling with the confronting ends of two soft metal pipes, and fifth, to accomplish the above results by a coupling that can be easily and quickly installed. These and such other objects as may hereinafter appear are attained by the novel construction, combination and arrangement of parts to be hereinafter described and then claimed, and reference will now be had to the drawing forming a part of this specification, wherein there is illustrated a preferred embodiment of the invention, but it is to be understood that the structural elements thereof can be varied or changed without departing from the scope of the appended claim.

In the drawings: Figure 1 is a longitudinal sectional view of the coupling designed for connecting a wrought iron pipe to a lead pipe. Fig. 2 is a cross sectional view of the same taken on the line x—x of Fig. 1. Fig. 3 is a cross sectional view taken on the line w—w of Fig. 1. Fig. 4 is a longitudinal sectional view of a coupling designed for connecting the confronting ends of two lead pipes, and Fig. 5 is an end view of the coupling shown in Fig. 1.

In the accompanying drawings the reference numeral 1 denotes a coupling member comprising a body having a longitudinal bore 2 extending from one end thereof to the opposite end. This member intermediate the ends thereof is provided with an annular flange 3 and formed integral with the outer edge of said flange is a sleeve 4 having the inner walls thereof screw threaded, as at 5. The sleeve 4 incloses the inner end 6 of the coupling member and the periphery of the member is provided with circumferentially arranged ratchet teeth 7. The outer end of the member is exteriorly screw threaded, as at 8, whereby a wrought iron pipe (not shown) can be connected to the coupling member. The flange 3 has the outer edges thereof provided with flat surfaces 9 to form a hexagon configuration that will permit of a wrench positively gripping the flange to hold the coupling member 1 while the wrought iron pipe is being screwed upon the outer end thereof.

10 denotes a lead pipe having the end thereof enlarged and flared, as at 11 whereby it can be sprung over the circumferentially arranged ratchet teeth 7 of the inner end of the member 1, and to prevent said pipe from rotating upon the inner end of the coupling member, the inner wall of the flange 3 is provided with radially disposed teeth 12 adapted to engage in the end of the lead pipe. To lock the lead pipe within the sleeve 4 a gland 13 is employed, the bore of the gland being tapered, as at 14, to conform to the flared end of the lead pipe, and said gland is screw threaded to engage the threads 5 with the outer end thereof hexagon-shaped similar to the flange 3 whereby a wrench can be placed upon the gland to screw the same into the sleeve 4, thereby locking the flared end of the lead pipe in engagement with the inner end 6 of the coupling member.

In Fig. 4 of the drawings, I have illustrated a modification of my invention wherein the coupling member is constructed to receive the ends of two lead pipes, the coupling member having the annular flange 3 thereof provided with a sleeve 15 that incloses both ends of the coupling member and both ends are identical in construction similar to the inner end 6 previously described. Two glands are used and the confronting ends of the lead pipes are connected just as firmly as though solder or other material were used.

What I claim is:

In a pipe coupling, the combination with a lead pipe having a flared and enlarged end, of a coupling member adapted to connect a wrought iron pipe to said lead pipe, said member comprising a body having a bore formed therein extending from one end of said body to the opposite end thereof, an annular flange carried by said body intermediate the ends thereof, a sleeve formed integral with the outer edges of said flange and inclosing the inner end of said member, said sleeve having the inner walls thereof screw threaded, the inclosed inner end of said member having circumferentially arranged ratchet teeth adapted to engage in the end of said lead pipe, radially disposed teeth carried by said flange at the inner end of said sleeve and adapted to engage the end of said lead pipe and prevent a rotation of said pipe upon said ratchet teeth, a gland adapted to be screwed into said member, said gland having the bore thereof tapered to engage the flared end of said lead pipe, and said member having the outer end thereof threaded and adapted to receive a wrought iron pipe, substantially as described.

In testimony whereof I affix my signature in the presence of two witnesses.

LAWRENCE MILLER.

Witnesses:
ROBERT HURDY,
FRED HEROLD.